(12) United States Patent
Smith

(10) Patent No.: US 7,793,117 B2
(45) Date of Patent: Sep. 7, 2010

US007793117B2

(54) METHOD, APPARATUS AND SYSTEM FOR DETERMINING POWER SUPPLY TO A LOAD

(75) Inventor: David E. Smith, Vancouver, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 792 days.

(21) Appl. No.: 11/581,046

(22) Filed: Oct. 12, 2006

(65) Prior Publication Data

US 2008/0103609 A1 May 1, 2008

(51) Int. Cl.
*G06F 1/26* (2006.01)

(52) U.S. Cl. ........................................ 713/300; 713/320

(58) Field of Classification Search ................. 713/300, 713/320

See application file for complete search history.

(56) References Cited

U.S. PATENT DOCUMENTS

| | | | |
|---|---|---|---|
| 3,727,103 | A | 4/1973 | Finch et al. |
| 3,767,327 | A | 10/1973 | Wagenseil |
| 4,016,408 | A | 4/1977 | Koetzle |
| 4,459,469 | A | 7/1984 | Ishima |
| 4,495,568 | A | 1/1985 | Gilbert et al. |
| 4,539,487 | A | 9/1985 | Ishii |
| 4,564,749 | A | 1/1986 | Ishima |
| 4,567,353 | A | 1/1986 | Aiba |
| 4,569,585 | A | 2/1986 | Masuda |
| 4,590,362 | A | 5/1986 | Ishima |
| 4,660,057 | A | 4/1987 | Watanabe et al. |
| 4,809,608 | A | 3/1989 | Wolnick et al. |
| 5,013,981 | A | 5/1991 | Rodi |
| 5,086,570 | A | 2/1992 | Matheus |
| 5,187,757 | A | 2/1993 | Ohno et al. |
| 5,200,708 | A | 4/1993 | Morris et al. |
| 5,212,498 | A | 5/1993 | Sugimori |
| 5,214,442 | A | 5/1993 | Roller |
| 5,229,651 | A | 7/1993 | Baxter, Jr. et al. |
| 5,248,967 | A | 9/1993 | Daneshfar |

(Continued)

FOREIGN PATENT DOCUMENTS

EP 0260629 9/1987

(Continued)

OTHER PUBLICATIONS

Elgee et al.; "Air Heating Apparatus"; U.S. Appl. No. 10/832,089, filed Apr. 26, 2004; USPTO Office Action issued Jul. 17, 2007.

(Continued)

*Primary Examiner*—Chun Cao

(57) ABSTRACT

Embodiments of determining power to be supplied to a load are disclosed. In one embodiment, the method includes determining an amount of power to supply to a load included in a first system having a plurality of loads, using a relationship between a change in the voltage provided by a power source to the first system caused due to a current drawn by one or more other systems coupled to the power source and a corresponding change in current supplied by the power source to the first system monitored over a predetermined time interval, to reduce a magnitude of the change in the voltage resulting from the power source, and causing the determined amount of the power to be supplied to the load.

20 Claims, 8 Drawing Sheets

U.S. PATENT DOCUMENTS

| | | | | |
|---|---|---|---|---|
| 5,349,905 | A | 9/1994 | Taylor et al. | |
| 5,390,011 | A | 2/1995 | Theodoulou | |
| 5,412,303 | A | 5/1995 | Wernicki | |
| 5,422,662 | A | 6/1995 | Fukushima et al. | |
| 5,457,516 | A | 10/1995 | Kim | |
| 5,483,149 | A | 1/1996 | Barrett | |
| 5,502,361 | A | 3/1996 | Moh et al. | |
| 5,545,876 | A | 8/1996 | Park | |
| 5,550,637 | A | 8/1996 | Murakami | |
| 5,682,185 | A | 10/1997 | Wade et al. | |
| 5,699,239 | A | 12/1997 | Komori | |
| 5,730,438 | A | 3/1998 | Webb et al. | |
| 5,781,205 | A | 7/1998 | Silverbrook | |
| 5,825,381 | A | 10/1998 | Choo | |
| 5,841,449 | A | 11/1998 | Silverbrook | |
| 5,842,027 | A | 11/1998 | Oprescu et al. | |
| 5,844,581 | A | 12/1998 | DeJoseph et al. | |
| 5,880,578 | A | 3/1999 | Oliveira et al. | |
| 5,978,285 | A | 11/1999 | Ingalls | |
| 6,035,357 | A | 3/2000 | Sakaki | |
| 6,072,163 | A | 6/2000 | Armstrong et al. | |
| 6,072,585 | A | 6/2000 | Dutton et al. | |
| 6,132,038 | A | 10/2000 | Szlucha | |
| 6,178,299 | B1 | 1/2001 | Kim | |
| 6,198,643 | B1 | 3/2001 | Gray | |
| 6,199,969 | B1 | 3/2001 | Haflinger et al. | |
| 6,208,258 | B1 | 3/2001 | Redilla | |
| 6,219,591 | B1 * | 4/2001 | Vu et al. | 700/286 |
| 6,243,626 | B1 | 6/2001 | Schanin | |
| 6,244,700 | B1 | 6/2001 | Kimura et al. | |
| 6,246,842 | B1 | 6/2001 | McClure | |
| 6,301,674 | B1 * | 10/2001 | Saito et al. | 713/340 |
| 6,302,507 | B1 | 10/2001 | Prakash et al. | |
| 6,315,381 | B1 | 11/2001 | Wade et al. | |
| 6,334,660 | B1 | 1/2002 | Holstun et al. | |
| 6,386,674 | B1 | 5/2002 | Corrigan, III et al. | |
| 6,396,674 | B1 | 5/2002 | Chen et al. | |
| 6,409,298 | B1 | 6/2002 | Ahne et al. | |
| 6,415,244 | B1 | 7/2002 | Dickens et al. | |
| 6,418,002 | B1 | 7/2002 | Yang et al. | |
| 6,428,160 | B2 | 8/2002 | Roy et al. | |
| 6,459,175 | B1 | 10/2002 | Potega | |
| 6,465,987 | B1 | 10/2002 | Haas et al. | |
| 6,496,665 | B2 | 12/2002 | Umezawa et al. | |
| 6,528,957 | B1 | 3/2003 | Luchaco | |
| 6,565,176 | B2 | 5/2003 | Anderson et al. | |
| 6,591,073 | B1 | 7/2003 | Fujii | |
| 6,601,001 | B1 | 7/2003 | Moore | |
| 6,688,719 | B2 | 2/2004 | Silverbrook et al. | |
| 6,782,482 | B2 * | 8/2004 | Nishizawa | 713/320 |
| 6,787,050 | B2 | 9/2004 | Parish | |
| 6,868,623 | B2 | 3/2005 | Bjornberg | |
| 7,044,571 | B2 | 5/2006 | Smith et al. | |
| 7,142,993 | B2 | 11/2006 | Smith et al. | |
| 7,149,902 | B2 | 12/2006 | Ryu | |
| 7,203,852 | B2 * | 4/2007 | Cohen et al. | 713/320 |
| 7,210,048 | B2 * | 4/2007 | Bodas | 713/320 |
| 7,356,385 | B2 * | 4/2008 | Lenarduzzi et al. | 700/295 |
| 2001/0019279 | A1 | 9/2001 | Martin et al. | |
| 2002/0140964 | A1 | 10/2002 | Goto et al. | |
| 2002/0149637 | A1 | 10/2002 | Miyakoshi et al. | |
| 2002/0162080 | A1 | 10/2002 | Takahashi et al. | |
| 2002/0188876 | A1 | 12/2002 | Forbes et al. | |
| 2003/0079150 | A1 | 4/2003 | Smith et al. | |
| 2003/0085621 | A1 | 5/2003 | Potega | |
| 2003/0193538 | A1 | 10/2003 | Silverbrook et al. | |
| 2003/0202813 | A1 | 10/2003 | Schoedinger | |
| 2004/0003299 | A1 | 1/2004 | Malueg et al. | |
| 2004/0003300 | A1 | 1/2004 | Malueg et al. | |
| 2004/0028422 | A1 | 2/2004 | Umezawa et al. | |
| 2004/0039960 | A1 | 2/2004 | Kassayan | |
| 2004/0084971 | A1 | 5/2004 | Shukla et al. | |
| 2004/0095115 | A1 | 5/2004 | Kernahan et al. | |
| 2004/0139038 | A1 | 7/2004 | Ehlers et al. | |
| 2004/0139360 | A1 | 7/2004 | Bliley et al. | |
| 2004/0151513 | A1 | 8/2004 | Nomura | |
| 2004/0172207 | A1 * | 9/2004 | Hancock et al. | 702/60 |
| 2004/0184208 | A1 | 9/2004 | Liu | |
| 2004/0187042 | A1 | 9/2004 | Kawanabe | |
| 2004/0246512 | A1 | 12/2004 | Miyamoto | |
| 2005/0088678 | A1 | 4/2005 | Namura | |
| 2005/0102539 | A1 | 5/2005 | Hepner et al. | |
| 2005/0122214 | A1 * | 6/2005 | Lin | 340/442 |
| 2005/0138438 | A1 | 6/2005 | Bodas | |
| 2005/0237370 | A1 | 10/2005 | Elgee et al. | |
| 2005/0278556 | A1 | 12/2005 | Smith et al. | |

FOREIGN PATENT DOCUMENTS

| | | |
|---|---|---|
| GB | 2355518 | 4/2001 |
| JP | 08308101 | 11/1996 |
| JP | 11-138950 | 5/1999 |
| JP | 2000-033751 | 2/2000 |
| JP | 2001-088402 | 4/2001 |
| WO | WO02/10861 | 2/2002 |

OTHER PUBLICATIONS

Elgee et al.; "Air Heating Apparatus"; Appln No. GB 0507669.0; filed Apr. 15, 2005; British Search Report issued Aug. 12, 2005.

* cited by examiner

METHOD, APPARATUS AND SYSTEM FOR DETERMINING POWER SUPPLY TO A LOAD

BACKGROUND

Drawing power from an AC mains may result in a reduction in the voltage provided by the AC mains. The reduction in the voltage provided by the AC mains may interfere with the proper operation of assemblies configured to operate using power from the AC mains.

BRIEF DESCRIPTION OF THE DRAWINGS

Shown in FIG. 1 is a representation of an embodiment of a system.

Shown in FIG. 2 is a graph showing an embodiment of a relationship between voltage loss and circuit length.

Figure 3A:
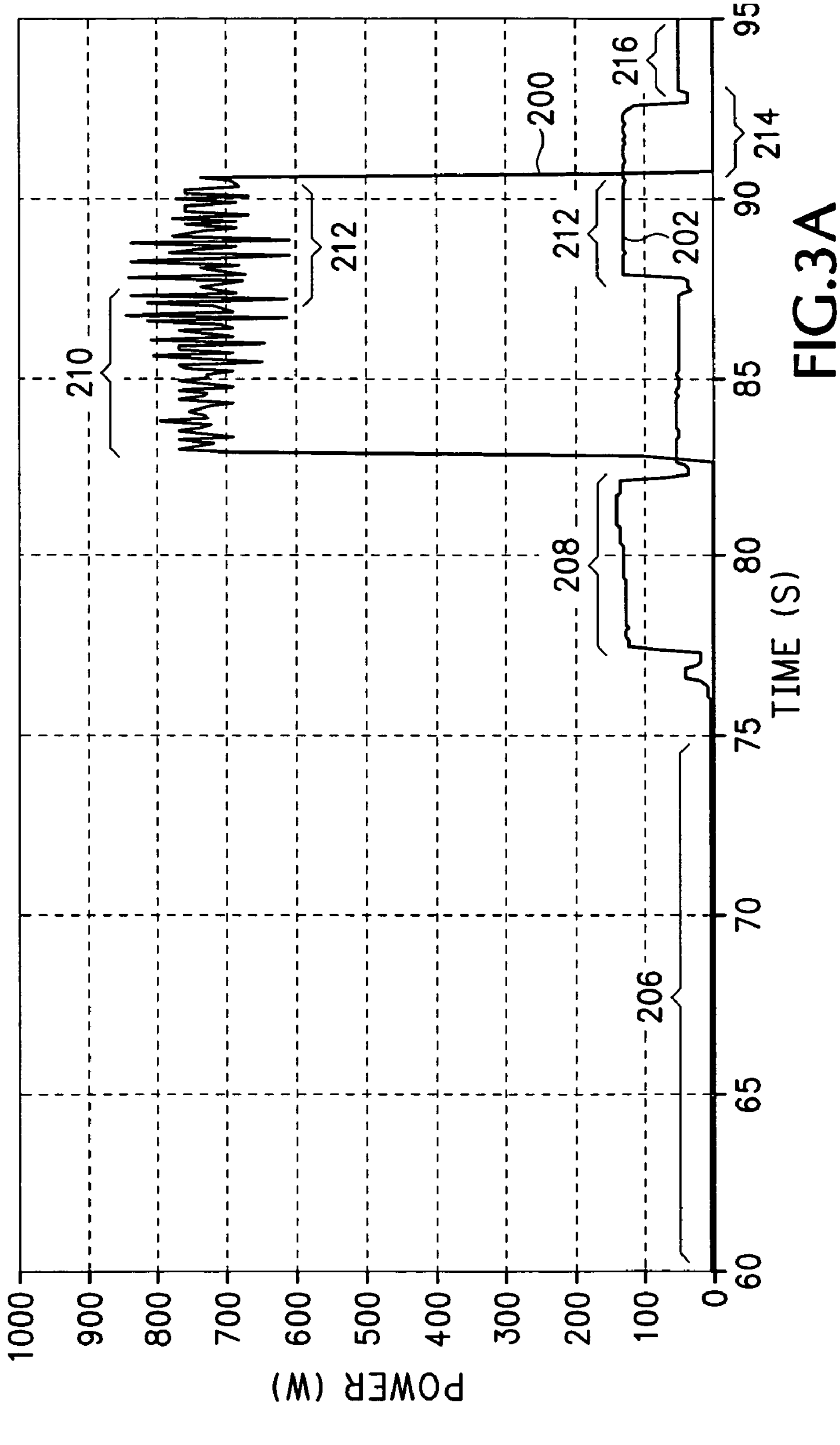
Figure 3B:
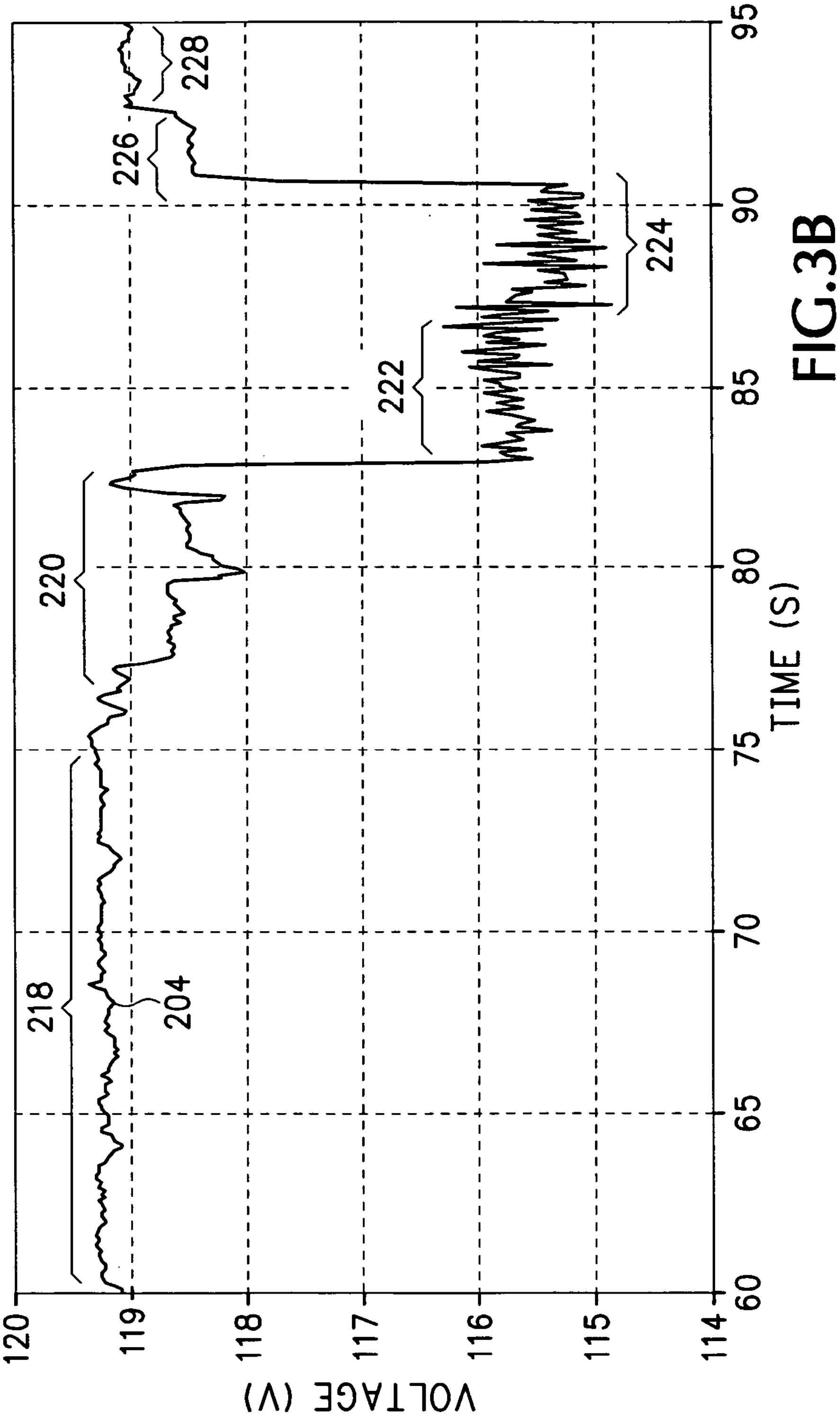

Shown in FIGS. 3A and 3B are example embodiments of power drawn by a system and other devices with respect to time.

Figure 4A:
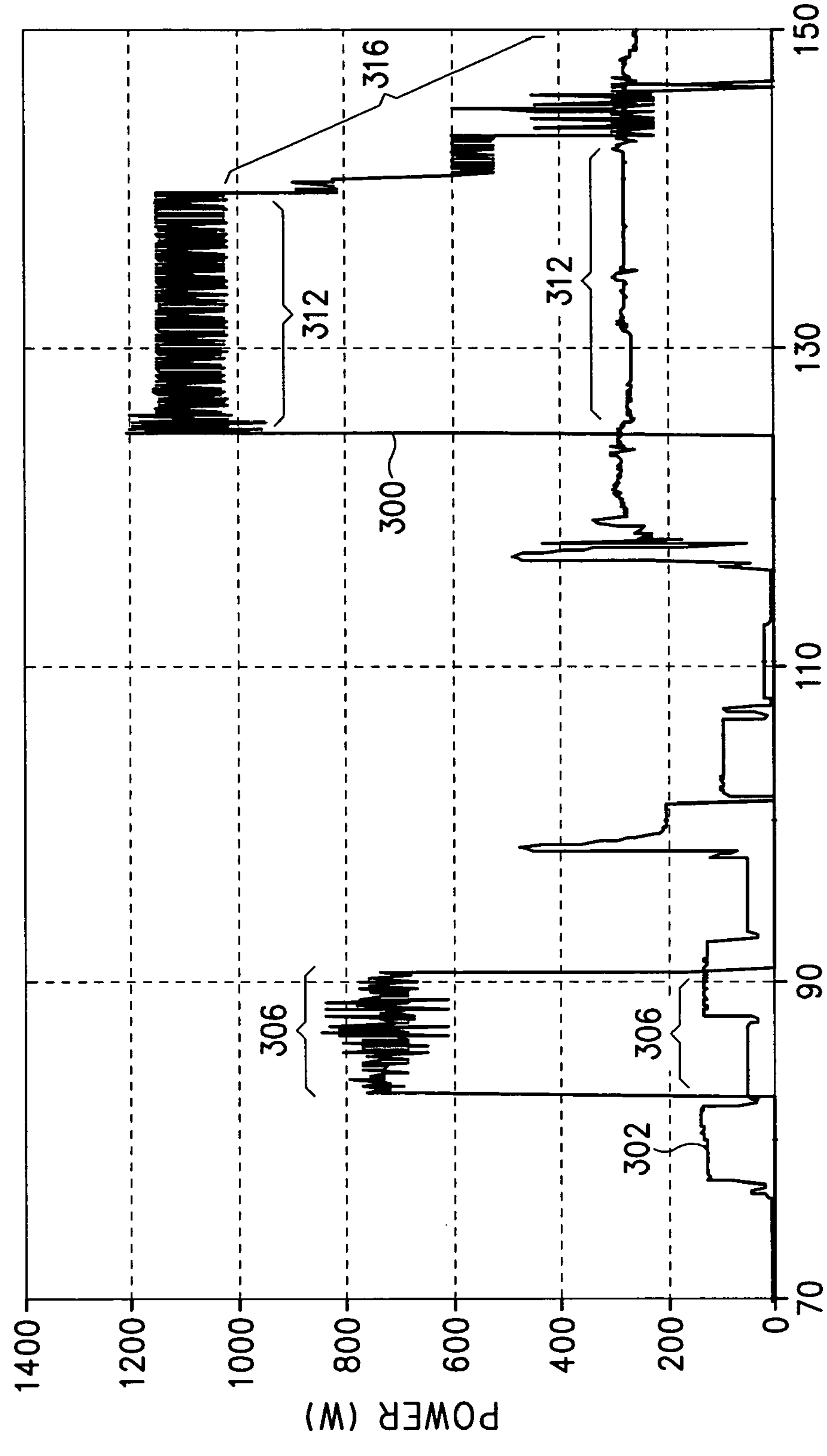
Figure 4B:
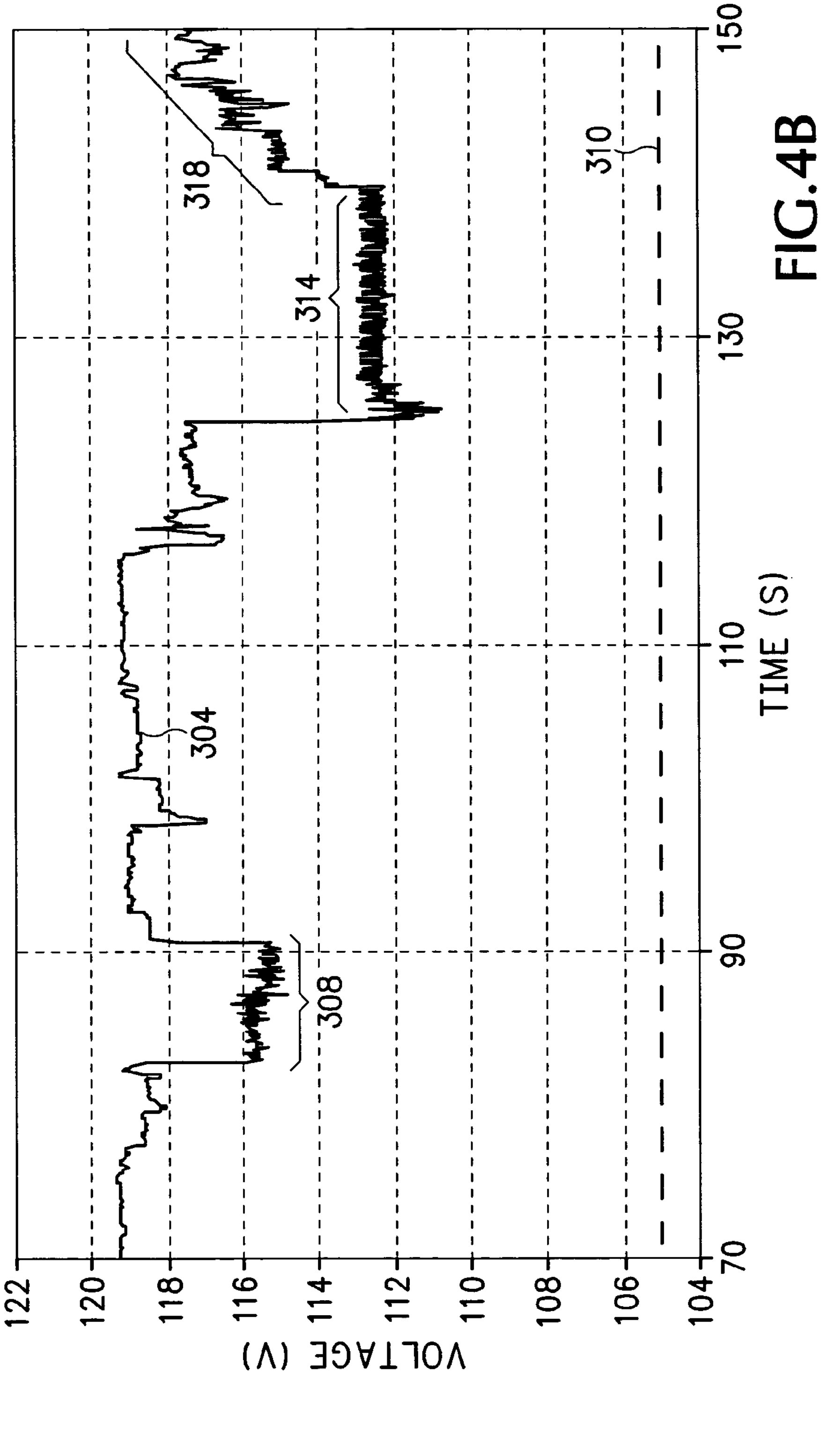

Shown in FIGS. 4A and 4B are graphs corresponding to operation of an embodiment of a system and other devices.

Figure 5:
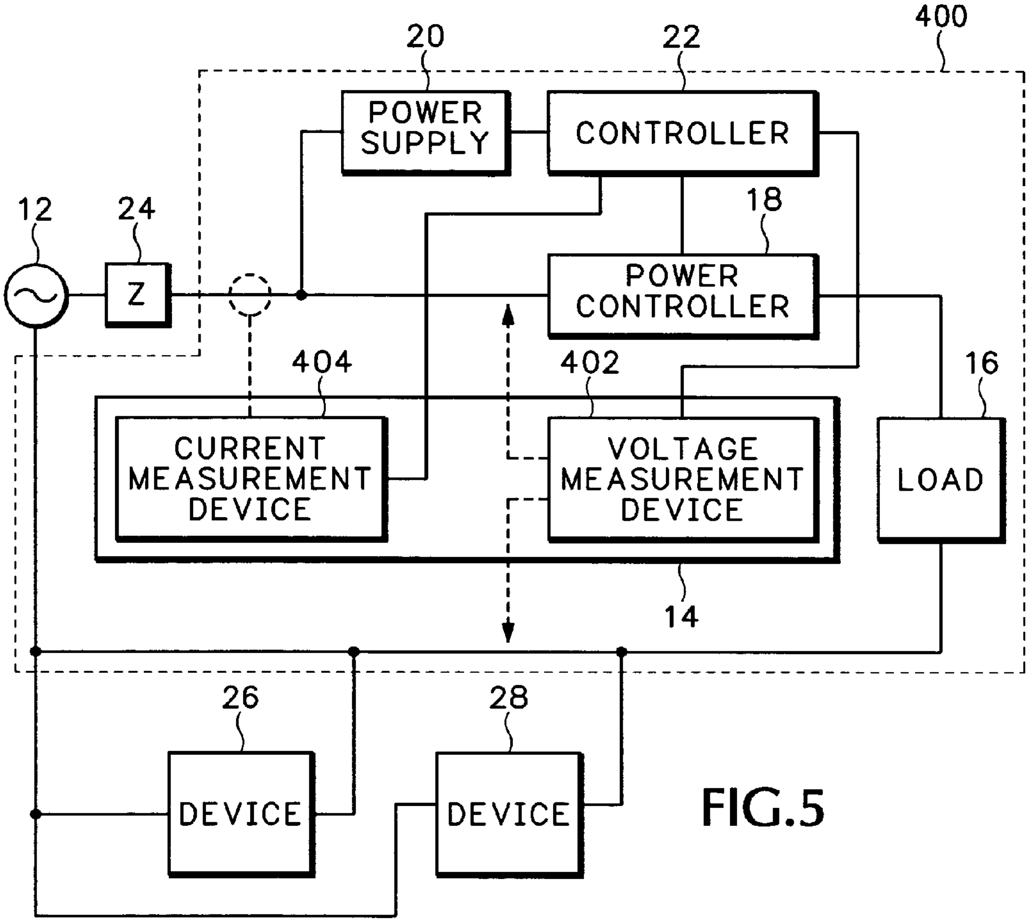

Shown in FIG. 5 is an embodiment of a system.

Figure 6:
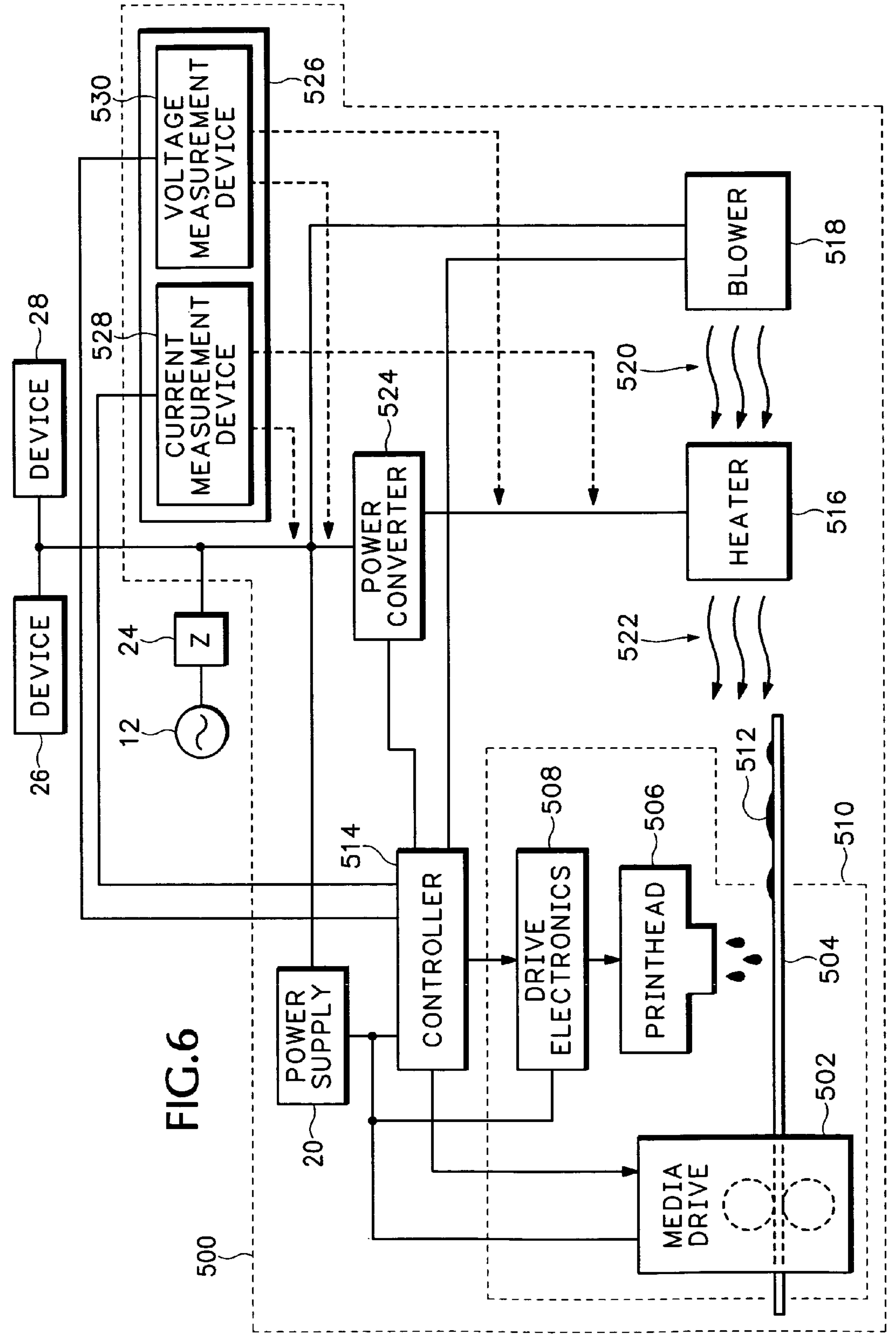

Shown in FIG. 6 is an embodiment of an image forming system.

Figure 7:
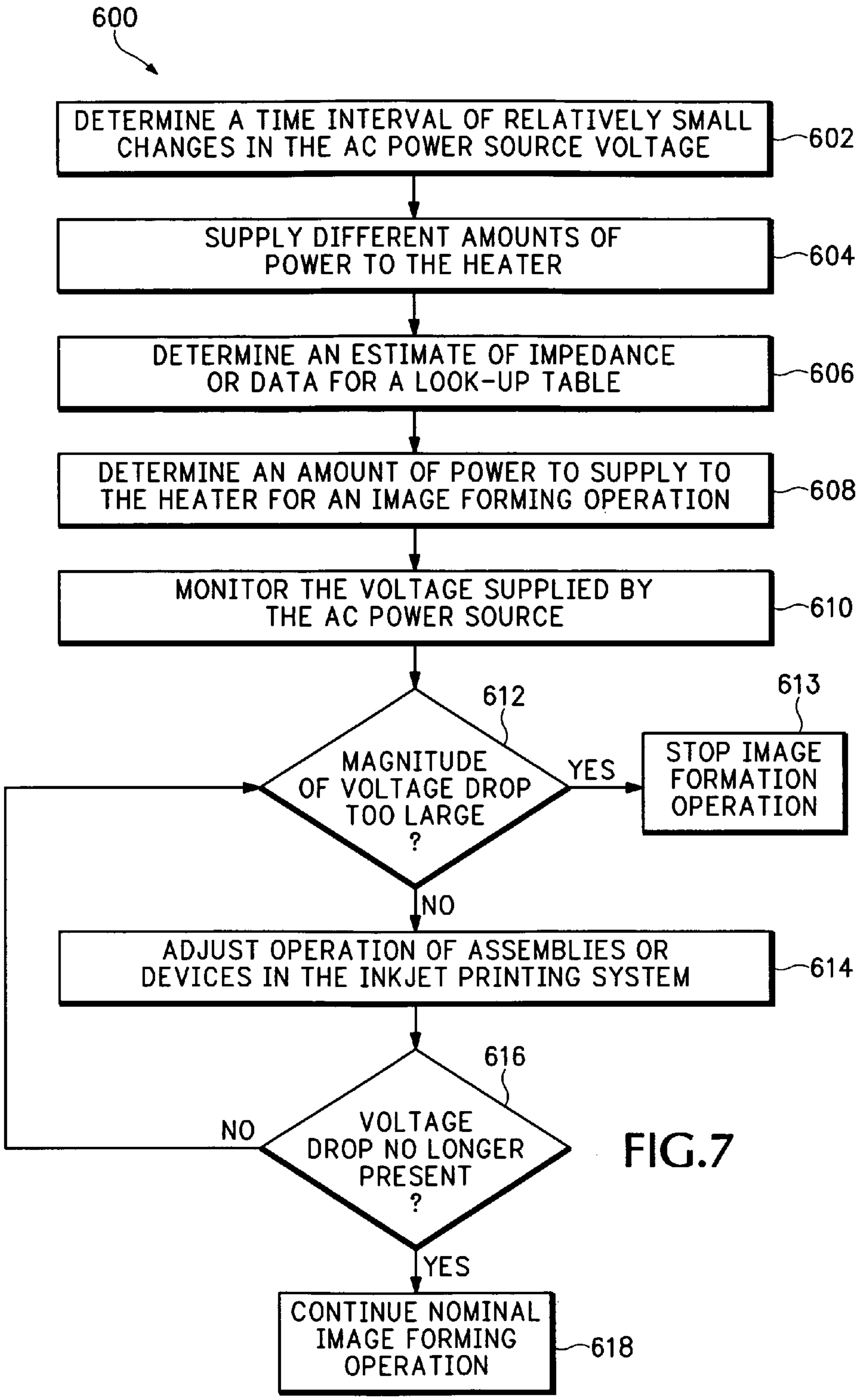

Shown in FIG. 7 is an embodiment of a method.

DETAILED DESCRIPTION

Figure 1:
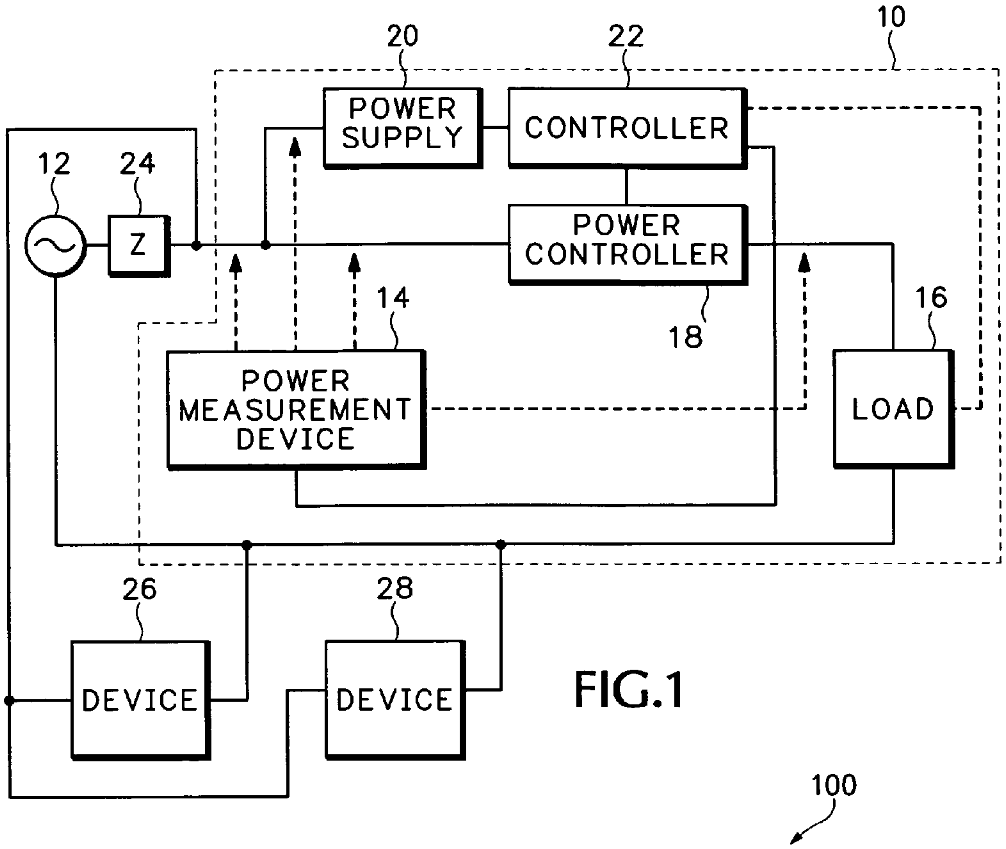

Shown in FIG. 1 is a simplified block diagram representation of an embodiment of a system, such as system 10. As indicated by the dashed lines in FIG. 1, power source 12, impedance 24, device 26, and device 28 are not included within system 10. An embodiment of a power source, such as power source 12, may supply power to system 10 during operation. In one embodiment, power source 12 includes an AC power source, in some embodiments an AC mains that may provide an AC line voltage such as 110 VRMS to 120 VRMS or 220 VRMS to 240 VRMS. An embodiment of a power measurement device, such as power measurement device 14, may, in one embodiment, be configured to provide an estimate of the power supplied by power source 12 to system 10. In another embodiment, power measurement device 14 may be configured to provide an estimate of the power supplied by power source 12 to parts of system 10, such as an embodiment of a load, such as load 16 (with measurement of these different powers depicted by the dashed lines terminated in arrows in FIG. 1) as well as the power supplied by power source 12 to system 10. Providing an estimate of the power by making either of these measurements may give an indication of the power usage of load 16. Load 16 may be any device or apparatus that receives power provided by an embodiment of a power controller, such as power controller 18. In some embodiments, power controller 18 may include a switching device, such as a triac or a MOSFET, which operates to control the power provided to load 16 from power source 12. In other embodiments, power controller 18 may include another type of power regulating device to affect the power provided to load 16. Power supply 20 is used to supply power to various assemblies included within system 10. An embodiment of a processing device, such as controller 22, is configured to direct power controller 18 to provide an amount of power to load 16, which may be a targeted or intended amount of power that it is desired to supply to load 16. Power measurement device 14 provides the estimate of the power usage of the system 10 and/or of load 16 to controller 22. In one embodiment, power measurement device 14 may be implemented using components such as the ADE7753 or the ADE7755, available through Analog Devices Corporation.

Impedance 24 (labeled Z in FIG. 1) represents the impedance associated with the power source 12. With respect to the voltage provided at the input of system 10, impedance 24 may be regarded as included within power source 12. Impedance 24 may represent the resistance and the reactance, such as inductive reactance, between power source 12 and the various systems and/or devices (such as system 10, device 26 and device 28) contributed by power source 12 and the conductors coupling power source 12 to these systems and/or devices. The configuration disclosed in FIG. 1 could correspond to an implementation in which system 10 is supplied power from power source 12 through a circuit in which one or more other systems and/or devices are also supplied power from power source 12 through the circuit.

The current drawn by these systems and/or devices, other than system 10, from power source 12 during operation may result in a voltage drop across impedance 24 of magnitude sufficient to cause some difficulty in the operation of assemblies or devices within system 10, such as power supply 20. For example, consider an embodiment of power supply 20 that includes a DC power supply, such as a switching power supply. This embodiment of power supply 20 may have a range of operating input voltage at the input of system 10 and provided by power source 12 for which power supply 20 is able to properly operate to provide output voltages within a specified range. Outside of this range of input voltage from power source 12, power supply 20 may not provide output voltages within the specified range.

For the case in which power supply 20 includes a switching power supply, a decrease in the voltage provided to the input of power supply 20 (such as that that may result from the voltage drop across impedance 24 when one or more of device 26 or device 28 are drawing a sufficiently large current) of sufficient magnitude may result in the switching power supply stopping operation. As a result, this may interfere with the desired operation of system 10. If the voltage drop across impedance 24 is sufficiently large, the voltage present on the primary storage capacitors on the line side of the switching power supply would not have sufficient voltage for proper operation of the switching power supply.

Various factors could occur singly or in combination that might bring about this result. For example, the resistive component of impedance 24 may be sufficiently large for the range of currents drawn by one or more of system 10, device 26, and device 28 that, even with power source 12 providing a voltage within the normal expected range around the nominal voltage of power source 12 (such as 120 VRMS or 240 VRMS), the voltage present at the input to power supply 20 may drop below a value specified for proper operation of power supply 20. This result could come about because of particular characteristics of power source 12 or the hardware used to connect power source 12 to system 10, device 26, and device 28 (which may contribute to the magnitude of impedance 24) or a combination of the characteristics of the hardware and the power source alone or along with other factors.

Consider, for example a circuit used for delivering power from power source 12 to system 10, device 26, and device 28. In some installations this circuit may include conductors, such as copper wire, sized for safely carrying up to 15 amps RMS continuously during operation of system 10, device 26, and device 28. For these types of circuits a 15 amp circuit breaker may be used in the circuit along with 14 gauge wire. In other installations, the circuit may include conductors sized for safely carrying up to 20 amps RMS continuously during operation of system 10, device 26, or device 28. For these types of circuits a 20 amp circuit breaker may be used in the circuit along with 12 gauge wire. In other types of circuits, other sizes of circuit breakers, of larger or smaller current carrying capacity than 15 amps of 20 amps, may used. In other types of circuits, other gauges of wire, of larger or smaller gauge than 12 gauge or 14 gauge, may be used. The resistance in series with power source 12 (that contributes to a resistive component to impedance 24) increases with the length of the conductors from power source 12 to system 10 and, for a given length of these conductors, increases as the gauge of the wire used for the conductors increases.

Another possible source contributing to the resistance component of impedance 24 can result from the resistance associated with connections included in the circuit used for delivering power from power source 12 to system 10. The resistance associated with these connections may include, for example, a resistance of terminal connections (which may be screw type and/or clamping type) of the circuit breaker (or fuse) to which the conductors in the circuit are connected, a resistance between the contacts of a wall plug receptacle through which power is delivered to system 10, device 26, or device 28, and a resistance of the terminal connections of the wall plug receptacle to which the conductors in the circuit are connected. Depending upon the particulars of the circuit used to deliver power from power source 12 to system 10, device 26, or device 28, there may be additional sources of resistance that contribute to the resistive component of impedance 24 or there may be fewer sources of resistances that contribute to the resistive component of impedance 24.

Figure 2:
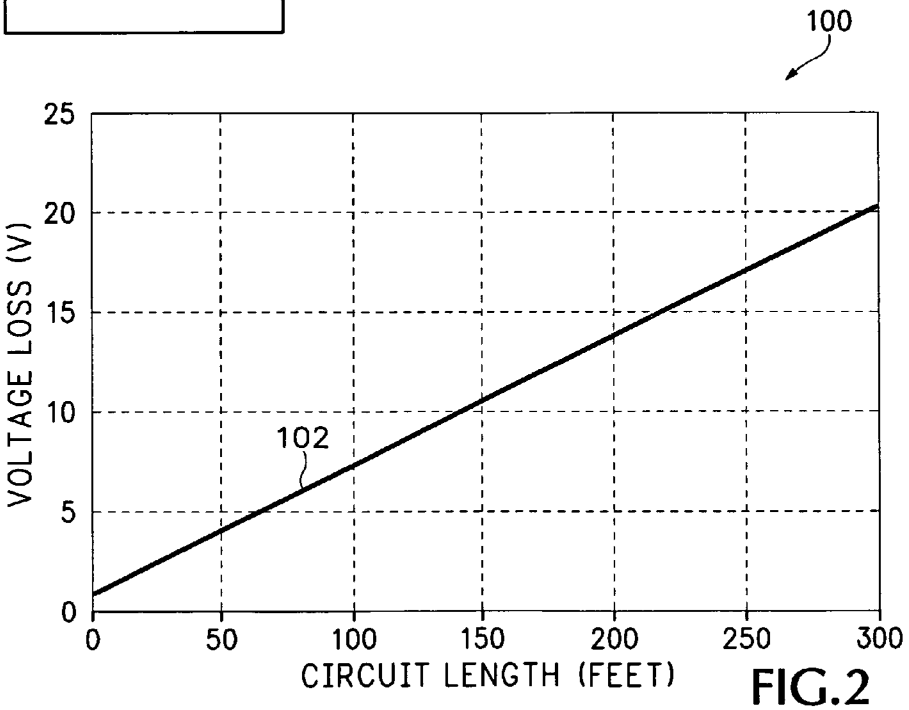

Shown in FIG. 2 is an embodiment of a relationship in graph 100 that may exist between a voltage drop across a conductor in a circuit, as a function of the length of the conductor for a substantially constant value of current flowing through the conductor. The conductors in the circuit corresponding to the data of FIG. 2 include those connecting the circuit breaker to the wall plug receptacle but do not include the conductors associated with the power cord of the device drawing the current. Because the conductors associated with the power cord are not included in the circuit corresponding to the data of FIG. 2, the non-zero voltage drop indicated in FIG. 2 at a circuit length of 0 feet results from the current flow through the conductors associated with the power cord. The data of FIG. 2 corresponds to a situation for which approximately 20 amps would flow through 12 gauge wire used for the conductors. As can be seen from line 102, a significant voltage drop can result at this value of current from the resistance of the conductors in the circuit.

Consider the case for which power source 12 includes an AC power source, such as the AC mains available in commercial or residential installations, which should provide a nominal voltage of 120 VRMS to system 10 but actually provides less voltage, such as, for example, 108 VRMS. This drop from the nominal value in the voltage provided may come about because of current draw on the power source 12 from, among other things, the operation of device 26 or device 28. Additionally, because of current draw at locations other than the particular commercial or residential installation of interest, or because of power generation difficulties with the power system, or some combination of these factors or other factors, power source 12 may provide a voltage less than a nominal voltage of 120 VRMS to system 10.

Consider the case in which power supply 20 will not correctly operate below a threshold RMS value of the voltage, such as 105 VRMS, on its input. For example, if the RMS magnitude of the AC input voltage to an embodiment of power supply 20 drops below the threshold, the embodiment of power supply 20 may enter a shut down mode. Or, another embodiment of power supply 20 may, if the RMS input voltage drops below the threshold, cease to maintain output voltages of the embodiment of power supply 20 within specified values for certain ranges of loading. With 108 VRMS supplied by the AC mains to the installation, FIG. 2 suggests that with approximately at least 20 amps and approximately at least 50 feet of conductor length, the AC RMS voltage at the input to system 10 by power source 12 will result in the voltage below the threshold of 105 VRMS for proper operation of this embodiment of power supply 20. As is shown by this example, in some circumstances in which system 10 may operate, the characteristics of power source 12 (such as the value of impedance 24 that may be influenced by the length of conductors used and the resistance of connections) may be such that system 10 will not operate properly where an amount of power drawn by one or more of system 10, device 26, or device 28 is above a threshold amount. It should be recognized that other combinations of power drawn by one or more of system 10, device 26, or device 28 and voltage provided by power source 12 could result in the AC RMS voltage at the input to power supply 20 dropping below the voltage threshold for proper operation of power supply 20.

There other characteristics of power source 12 that may contribute to the AC RMS voltage at the input to power supply 20 dropping below the threshold for proper operation of power supply 20. The reactance associated with impedance 24 may contribute to transient variations in the AC voltage provided by power source 12 that could interfere with the proper operation of power supply 20. For example, if the impedance 24 associated with power source 12 included a sufficiently large inductive component, changes in the power drawn by one or more of system 10, device 26, or device 28 could result in time varying voltage transients in power source 12 of sufficiently low frequency so that the voltage provided to the input of power supply 20 is at a low value for a sufficiently long time interval such that the primary storage capacitors that may be included in an embodiment of power supply 20 discharge to a voltage at which power supply 20 enters a shut down mode.

The power drawn by one or more of system 10, device 26, or device 28 may vary with time. Changing modes of operation of one or more of the assemblies or devices dissipating power within one or more of system 10, device 26, or device 28 may change the power drawn from power source 12. For example, some embodiments of loads in system 10, device 26, or device 28 may operate in a time varying fashion. With respect to system 10, controller 22 may include a configuration to control the operation of power controller 18 so that during certain time periods power is dissipated in load 16 and during other time periods substantially no power is dissipated in load 16. One embodiment of load 16 may include a heater having one or more heating elements. For these embodiments of system 10, controller 22 includes a capability to actuate load 16 (as indicated by the dashed line between controller 22 and load 16 in FIG. 1) to connect one or more of the heating elements into the circuit including power controller 18 so that power controller 18 can control the dissipation of power in the one or more heating elements. Causing the one or more heating elements included in load 16 to switch into or out of the circuit including power controller 18 results in the power drawn by system changing at times corresponding to when the one or more heating elements switch into or out of the circuit. Similarly, one or more of device 26 or device 28 may include loads that draw current in a time varying manner such that the power dissipated in device 26 or device 28 varies with time.

The power drawn by one or more of system 10, device 26 or device 28 changing at various times results in a change in the current drawn by the system or devices at the various times, a change in the voltage drop across impedance 24 at the various times, and a change in the voltage provided by power source 12 to the input of system 10 at the various times. As explained above, decreases in the voltage provided by power source 12 at the input of system 10 of sufficient magnitude may result in some assemblies or devices within system 10, such as power supply 20, ceasing to operate in a desired manner. By controlling the power dissipated by one or more assemblies or devices included with system 10 in view of the decreases that may occur in the voltage provided by power source 12 at the input of system 10, the likelihood of operation of some assemblies or devices within system 10 in an undesired manner may be reduced.

In one embodiment of system 10, an embodiment of power measurement device 14 includes a voltage measurement device capable of measuring the voltage supplied at the input of system 10 by power source 12 and a current measurement device capable of measuring the current supplied to system 10 by power source 12. In this embodiment, controller 22 makes use of the voltage measurement device to identify a time period during which there is a reduced likelihood that another system or device coupled to power source 12 (other than system 10), such as device 26 or device 28, will operate in a manner that will cause perturbations in the RMS value of the voltage provided by power source 12. In this embodiment of system 10, controller 22 includes a configuration to operate power controller 18 to control the power dissipated in load 16 so that a range of amounts of power are dissipated in load 16. For different amounts of power dissipated in load 16, the voltage measurement device included within the embodiment of the power measurement device 14 is used to measure the corresponding voltages provided at the input of system 10 by power source 12. In addition, for this embodiment of system 10, the embodiment of power measurement device 14 includes a current measurement device to measure the current provided to system 10 by power source 12 for the different amounts of power dissipated within system 10, such as in load 16. The process of making measurements of the voltage provided at the input of system 10 by power source 12 and the current provided to system 10 by power source 12 provides data to determine an estimate of the magnitude of impedance 24. As will be explained in further detail, this estimate of the magnitude of impedance 24 can be used to determine an adjustment to the power to be dissipated in one or more devices or assemblies, such as load 16, included within system 10 to reduce the likelihood that one or more of these devices or assemblies, such as power supply 20, does not operate as desired while other systems or devices, such as device 26 and/or device 28, are powered by power source 12.

Shown in FIG. 3A and FIG. 3B are graphs showing an embodiment of a possible relationship between a voltage provided by an embodiment of an AC power source 12 and power dissipated within system 10 while timing varying currents are drawn by devices and systems (such as device 26 and/or device 28) other than system 10. In FIG. 3A, trace 200 represents the power dissipated in system 10 with respect to time. Also in FIG. 3A, trace 202 represents the power dissipated by systems and/or devices (such as device 26 and/or device 28), other than system 10, coupled to AC power source 12, with respect to time. Shown in FIG. 3B is a graph showing changes in the voltage provided by AC power source 12 with respect to a period of time corresponding to that of FIG. 3A. Trace 204 represents the voltage provided by AC power source 12 at the input to system 10.

As can be generally observed from the disclosed relationship between the voltage provided by AC power source 12 and the power dissipated by system 10 and by systems and/or devices other than system 10, an increase in power dissipated within system 10 results in a corresponding decrease in the voltage provided by AC power source 12 and a decrease in power dissipated within system 10 results in a corresponding increase in the voltage provided by AC power source 12. The power dissipated in load 16 can be substantially greater than that of power supply 20 and so, with respect to the effect of system 10 upon the voltage provided by AC power source 12, operation of load 16 will likely have a greater influence on the voltage provided by AC power source 12 than will power supply 20. Consider regions 206, 208, 210, 212, 214, and 216 of traces 200 and 202 and corresponding regions 218, 220, 222, 224, 226 and 228 of trace 204. Regions 206 and 218 correspond to no or substantially no power dissipation within system 10 and the other systems and/or devices (such as device 26 and/or device 28) coupled to AC power source 12. Regions 208 and 220 correspond to power dissipation in systems and/or devices other than system 10 (such as device 26 and/or device 28) but not system 10. Regions 210 and 222 correspond to power dissipation in system 10 but reduced power dissipation in systems and/or devices other than system 10. Regions 212 and 224 correspond to power dissipation in both system 10 and systems and/or devices other than system 10 (such as device 26 and/or device 28). Regions 214 and 226 correspond to power dissipation in systems and/or devices other than system 10, but not system 10. Regions 216 and 228 correspond to no power dissipation system 10 and reduced power dissipation in systems and/or devices other than system 10.

Measurement of the current and voltage supplied by AC power source 12 for these corresponding regions of traces 200 and 204 provides data that can be used to provide an estimate of the magnitude of impedance 24. For example, using the current measurement device and the voltage measurement device included within an embodiment of power measurement device 14, the voltage and current provided by AC power source 12 to system 10 can be measured during a time interval when the current supplied by AC power source 12 to systems and/or devices other than system 10 has a relatively small amount of change (such as substantially equal to zero) and during a time interval when significant changes are occurring to the current drawn by system 10. In one embodiment, substantially equal to zero refers to changes in current of a magnitude such that changes in voltage of less than or equal to ten percent of the voltage value provided by AC power source 12 without changes in the current drawn by systems and/or devices other than system 10. The time interval corresponding to regions 212 and 214 of FIG. 3A and to regions 224 and 226 of FIG. 3B could be one such time interval during which measurements of current and voltage provided by AC power source 12 are made that are then used to estimate the magnitude of impedance 24. During this time interval, the current drawn by system 10 has significant changes. For much of this time interval, the current drawn by systems and/or devices other than system 10 has relatively small changes.

One way in which the estimate of the magnitude of impedance 24 can be determined is by using the measured change in the voltage provided by AC power source 12 to system 10 and the measured change in the current provided by AC power source 12 to system 10 during this time interval. The ratio of the measured change in the voltage to the measured change in the current provides an estimate of the magnitude of impedance 24. One way in which a suitable time interval for making measurements used to determine an estimate of impedance 24 could be determined is to use the voltage measurement device to monitor the voltage provided by AC power source 12 while the current drawn by system 10 is at least substantially constant. If the monitoring of the voltage provided by AC power source 12 while the current drawn by system 10 is at least substantially constant indicates relatively small changes in the voltage, this indicates that it is likely a suitable time for making the measurements used to estimate the magnitude of impedance 24. Another way in which the suitable time interval could be determined is to select a time of day in which, historically, it is much less likely for systems and/or devices other than system 10 to be drawing significant levels of current from AC power source 12. The estimate of the magnitude of impedance 24 may be stored in an embodiment of a computer readable medium, such as memory, included within controller 22 for use in determining how controller 22 is to cause power controller 18 to control the power dissipated in assemblies and devices included with system 10, such as load 16, so that the voltage will not likely drop below a threshold for proper operation of power supply 20 as systems and/or devices (such as device 26 and/or device 28) other than system 10 draw current from AC power source 12.

Shown in FIG. 4A and FIG. 4B are graphs representing possible exemplary operation of an embodiment of system 10 in a manner to adjust the power dissipated in system 10 so that the input voltage to power supply 20 is less likely to drop below a threshold for proper operation of power supply 20 as systems and/or devices (such as device 26 and/or device 28) other than system 10 draw currents from AC power source 12. In FIG. 4A, trace 300 represents the power that could be dissipated in system 10 and trace 302 represents power that could be dissipated in devices and systems (such as device 26 and/or device 28) other than system 10. In FIG. 4B, trace 304 represents the voltage provided by AC power source 12 at the input of system 10. Consider regions 306 and 308 of traces 300, 302, and 304. In region 306, the power dissipated in system 10 has experienced a step change in value. The voltage supplied by AC power source 12 to system 10 experiences a corresponding downward step change in value. However, this change in the voltage provided by AC power source 12 remains above the threshold 310 for proper operation of power supply 20 by a desired amount because the sum of powers dissipated in system 10 (represented by regions 306) and by systems and/or devices other than system 10 (such as device 26 and/or device 28) is not sufficiently large.

Next consider regions 312 and 314 of traces 300, 302, and 304. While operation of system 10 corresponds to region 312 of trace 300 and the operation of systems and/or devices (such as device 26 and/or device 28) other than system 10 corresponds to region 312 of trace 302, the voltage supplied by AC power source 12 at the input to system 10 corresponds to region 314. In region 314, the voltage provided by AC power source 12 has dropped below a desired amount above the threshold 310 for proper operation of power supply 20 because of the sum power the powers represented by regions 312 which is indicative of the current drawn from AC power source 12. In response, controller 22 determines an adjustment to be made to the power dissipated in load 16 so that the voltage provided by AC power source 12 to the input of system 10 is a desired amount above the threshold 310 while systems and/or devices other than system 10 are drawing current from AC power source 12. In making this determination, controller 22 makes use of the estimated magnitude of the impedance 24 to modify the operation of system 10. Controller 22 determines, for example through computation or by using a look-up table, the level of current to be drawn by system 10 using the estimated magnitude of impedance 24 so that the voltage supplied by AC power source 12 is at least the desired amount above the threshold 310. Then, controller 22 causes power controller 18 to reduce the power dissipated in load 16 (as indicated in region 316) thereby causing a reduction in current drawn by system 10 and an increase in the voltage provided by AC power source 12 at the input of system 10 results (as indicated by region 318) to at least the desired level.

Shown in FIG. 5 is an embodiment of system 10, system 400, coupled to AC power source 12 through impedance 24 along with device 26 and device 28. As indicated by the dashed lines in FIG. 5, power source 12, impedance 24, device 26, and device 28 are not included within system 400. System 400 includes an embodiment of power measurement device 14 having a voltage measurement device 402 and a current measurement device 404. Voltage measurement device 402 is configured to measure the voltage provided by AC power source 12 at the input to system 400. The measurements of this voltage provided by voltage measurement device 402 and current measurement device 404 may be used in determining the estimate of the magnitude of impedance 24 previously mentioned as well as the power provided by AC power source 12 to system 400. In one embodiment, current measurement device 404 could be implemented using a current sense resistor with an amplifier and an A to D converter or with a device to sense a magnetic field resulting from the current to be measured, an amplifier, and an A to D converter. In one embodiment, voltage measurement device 402 could be implemented using a voltage divider, an amplifier and an A to D converter.

Shown in FIG. 6 is an embodiment of an image forming system, such as an embodiment of an inkjet printing system, inkjet printing system 500, shown in a simplified form for ease of illustration. Inkjet printing system 500 is coupled to AC power source 12 through impedance 24 along with device 26 and device 28. As indicated by the dashed lines in FIG. 6, power source 12, impedance 24, device 26, and device 28 are not included within system 500. In this situation, device 26 and device 28 could be any of a variety of loads that receive power from an AC power source, such as a 110 V-120 V or 220 V-240 V AC power source. Device 26 and device 28 could include such things as a microwave oven, a coffee maker, a personal computer, and/or a computer peripheral device. These kinds of loads, as well as others that may be included in device 26 and device 28, can draw substantial currents, including substantial transient currents, from AC power source 12. The flow of these currents causes voltage drops (in addition to those caused from the current drawn by inkjet printing system 500 flowing through impedance 24), including possibly transient voltage drops, in the voltage supplied by AC power source 12 to inkjet printing system 500 because of the current drawn by the systems and/or devices (other than the current drawn by inkjet printing system 500) through impedance 24.

Inkjet printing system 500 may beneficially make use of the techniques described previously described to reduce the likelihood that drops in the voltage supplied by AC power source 12 to inkjet printing system 500 will result in improper operation of one or more of devices or assemblies included within inkjet printing system 500. One way in which inkjet printing system 500 could operate (in a configuration in which devices or systems other than inkjet printing system 500 are drawing substantial currents) to reduce the likelihood of improper operation of assemblies or devices included within inkjet printing system 500, is to monitor the voltage provided by AC power source 12 and change the current drawn by one or more assemblies or devices included within inkjet printing system 500 to reduce a magnitude of the voltage drop caused by the current drawn by the systems and/or devices, other than inkjet printing system 500, flowing through impedance 24. Using the estimate of the magnitude of the impedance 24 previously determined, inkjet printing system 500 determines the changes to the operation of the one or more assemblies to reduce the magnitude of the voltage drop across impedance 24.

Ink jet printing system 500 includes an embodiment of a media movement mechanism, media drive 502, to move media, such as a unit of media 504, from a media storage bin (not shown in FIG. 6) past an embodiment of a colorant ejection device, such as printhead 506 during an image forming operation. Printhead 506 represents, as may be used in various embodiments of ink jet printing system 500, an array of one or more printheads. For ease of illustration, media drive 502 is shown as present at one location in the media path. However, in other embodiments, structure associated with media drive 502 may be located at various places within ink jet printing system 500 to perform the function of moving media within ink jet printing system 500. As unit of media 504 moves past printhead 506, colorant, such as ink 512, is ejected onto unit of media 504 to form an image corresponding to image data received by inkjet printing system 500. Signals provided to printhead 506 cause ejection of the ink 512 from printhead 506 to form the image. Drive electronics 508 generate the signals to cause printhead 506 to eject the ink 512 to form the image.

In inkjet printing system 500, media drive 502, printhead 506, and drive electronics 508 are included as part of an embodiment of an image forming mechanism, such as inkjet image forming mechanism 510. Other embodiments of an image forming mechanism may be configured for operation employing other types of image forming techniques. For example, an embodiment of an image forming mechanism, such as an electrophotographic image forming mechanism, may be suitably configured to use electrophotography to form an image on unit of media 504. An embodiment of an electrophotographic image forming mechanism may an include a laser scanner to emit a laser beam that can be selectively pulsed and moved relative to the surface of a photoconductor to form a latent electrostatic image on the photoconductor. Additionally, the electrophotographic image forming mechanism may include a charge roller to charge the surface of the photoconductor for selective discharge by the laser beam, and a developing unit that contains toner to be developed onto the latent electrostatic image and subsequently transferred to unit of media 504.

Various devices within inkjet printing system 500 may be supplied by power supply 20. An embodiment of a processing device, such as controller 514, provides data, formed using the image data, to drive electronics 508 to generate the signals provided to printhead 506. In various embodiments, controller 514 may include a microprocessor executing firmware or software instructions to accomplish its tasks. Or, controller 514 may be included in an application specific integrated circuit (ASIC), formed of hardware and controlled by firmware specifically designed for the tasks it is to accomplish. Furthermore, in alternative embodiments, the functionality associated with controller 514 may be distributed across one or more other devices included within inkjet printing system 500.

The software or firmware may be stored on an embodiment of a computer-readable media included within or separate from controller 514. A computer readable medium can be any media that can contain, store, or maintain programs and data for use by or in connection with the execution of instructions by a processing device. Computer readable media can comprise any one of many physical media such as, for example, electronic, magnetic, optical, electromagnetic, infrared, semiconductor media, or any other suitable media. More specific examples of suitable computer-readable media include, but are not limited to, a portable magnetic computer diskette such as floppy diskettes or hard drives, a random access memory (RAM), a read-only memory (ROM), an erasable programmable read-only memory, or a portable compact disc. Computer readable media may also refer to signals that are used to propagate the computer executable instructions over a network or a network system such as the Internet.

Controller 514 may include a configuration to provide signals to media drive 502 to influence the movement of media through ink jet printing system 500 for accomplishing the image formation operation. Furthermore, an embodiment of circuitry included within controller 514 includes a configuration to provide one or more signals that influence the operation of an embodiment of a heater, such as heater 516. Heater 516 may include an embodiment of a heating element that contributes to the heating of air near heater 516. An embodiment of an air movement device or mechanism, such as blower 518, may push air 520 toward heater 516 so that heat may be transferred from heater 516 to air 520. As air 520 moves past heater 516 on its way toward unit of media 504, heat is transferred to air 520. The heated air 522 continues to move from heater 516 toward unit of media 504. Heated air 522 passing over unit of media 504 provides energy to vaporize at least part of the fluid included in ink 512 deposited onto unit of media 504. In one embodiment, air including the vaporized portions of the fluid is discharged from ink jet printing system 500.

For an embodiment of an image forming system corresponding to an electrophotographic printing system, the embodiment of the heater would correspond to a device to fuse toner to media, such as a fuser. In the electrophotographic printing system, an embodiment of circuitry would include a configuration to provide one or more signals that influence the operation of the fuser.

Power is supplied to heater 516 by an embodiment of a power controller, such as power converter 524. Power converter 524 could be implemented using a wide variety of techniques, similar to the possibilities described for power controller 18. In one embodiment, power converter 524 is configured to attempt to supply an amount of power to heater 516 as directed by the operation of the embodiment of the circuitry included within controller 514. The one or more signals provided by the embodiment of the circuitry included within controller 514 to power converter 524 may be a digital value that is used by power converter 524 to attempt to supply the amount of power to heater 516 appropriate for a particular operation performed by ink jet printing system 500, such as vaporizing at least part of the fluid included in ink 512. In one embodiment, the digital value could be stored in a register included in an embodiment of power converter 524. The digital value may influence the rate at which a switching device included within power converter 524 operates. The amount of the power that the embodiment of the circuitry within controller 514 directs power converter 524 to provide to heater 516 is related to the image forming operations performed by inkjet printing system 500. For example, with deposition of ink 512 onto unit of media 504, the embodiment of the circuitry within controller 514 may direct power converter 524 to provide an amount of power to heater 516 suitable for vaporization of at least part of the fluid included within ink 512.

An embodiment of a power measurement device, such as power measurement device 526, may be used to measure one or more parameters associated with the operation of inkjet printing system 500 to provide an estimate of the voltage supplied by AC power source 12 and the current drawn by inkjet printing system 500. As indicated in FIG. 6, power measurement device 526 may be coupled to controller 514. Power measurement device 526 includes an embodiment of a current measurement device, such as current measurement device 528, and an embodiment of a voltage measurement device, such as voltage measurement device 530. Current measurement device 528 and voltage measurement device 530 provide the estimates, respectively, of the voltage provided by AC power source 12 and the current drawn by inkjet printing system 500.

The embodiment of circuitry included within controller 514 may be configured to determine (for example, in one embodiment, similar to what was described previously with respect to the operation of system 10) an estimate of the magnitude of impedance 24. This may be accomplished in various ways through the operation of the embodiment of the circuitry. In general, controller 514 may cause power converter 524 to supply different amounts of power to heater 516 with measurement of the voltage provided by AC power source 12 at the input of inkjet printing system 500 and current provided by AC power source 12 to inkjet printing system 500 during time periods when the different amounts of the power are supplied to heater 516 and during time periods when monitoring of the voltage provided by AC power source 12 indicates that changes in the magnitude of the voltage provided by AC power source 12 resulting from the current drawn by devices and systems other than inkjet printing system 500 (such as device 26 and device 28) are relatively small. From these measurements of voltage and current, the embodiment of the circuitry may determine, such as by computation using the measurements of voltage and current, the estimate of the magnitude of impedance 24. The value of the magnitude of impedance 24 is stored in memory included in controller 514. Alternatively, the memory included in controller 514 could store a table including corresponding values of the measured currents and voltages from which expected voltage changes occurring for corresponding changes in current could be determined. Or the table could directly store values of corresponding expected voltage changes and current changes.

Shown in FIG. 7 is an embodiment of a method 600 for operating inkjet printing system 500. An embodiment of controller 514 determines 602 a time interval when changes in the voltage provided by AC power source 12 caused by systems and/or devices coupled to AC power source 12, other than inkjet printing system 500, are likely to be relatively small. In one embodiment this time interval could be determined by monitoring the voltage provided by AC power source 12 while relatively small changes are occurring in the current drawn by inkjet printing system 500 using voltage measurement device 530 to determine when large changes in the voltage provided by AC power source 12 are not occurring. In another embodiment, previously collected data regarding the times during which current is drawn by systems and/or devices, other than inkjet printing system 500, from AC power source 12 could be used to select a time period when it is less likely that these systems and/or devices are drawing current. This may be, for example, in the early morning hours when devices like coffee makers, microwave ovens, or peripheral devices that may be coupled to AC power source 12 are less likely to be operating. In yet another embodiment, the previously collected data regarding current draw may be used along with the monitoring of the voltage provided by AC power source 12 to determine an interval during which changes in the voltage provided by AC power source 12 caused by systems and/or devices coupled to AC power source 12, other than inkjet printing system 500, are likely to be relatively small.

Next, controller 514, using power converter 524, causes 604 different amounts of power to be supplied to heater 516 while measuring the voltage and current provided by AC power source 12 using voltage measurement device 530 and current measurement device 528. Using these measurements, controller 514 determines 606 an estimate of impedance 24 or determines data for a look-up table that indicates an expected change in voltage provided by AC power source 12 resulting from a change in current drawn from AC power source 12. In various embodiments, this determination of impedance 24 or the data for the look-up table may be done each time inkjet printing system 500 emerges from a sleep mode, shortly after a power-up, or periodically while inkjet printing system 500 is operation. Then, as part of an operation to form images on units of media 504, controller 514 determines 608 an amount of power to supply to heater 516 to vaporize fluid included in ink 512 sufficiently fast to meet the desired rate of image forming throughput in inkjet printing system 500 and maintain the voltage supplied to various assemblies and devices in inkjet printing system 500 a desired amount above a voltage threshold for proper operation. Additionally, controller 514 controls the timing of the application of power to other assemblies and devices in inkjet printing system 500 used for an image forming operation.

While performing image forming operations (during which inkjet printing system 500 may draw substantial transient currents), voltage measurement device is used by controller 514 to monitor 610 the voltage supplied by AC power source 12. In one embodiment, controller 514 monitors the voltage supplied by AC power source at least five times a second. If controller 514 determines 612 that the magnitude of the drop of the voltage provided by AC power source 12 is sufficiently large (which in this situation is likely to occur as a result of current draw by systems and/or devices (such as device 26 and device 28) other than inkjet printing system 500 because the operation of inkjet printing system 500 has been controlled in an attempt to prevent this from happening) that the image forming operation of inkjet printing system 500, even at a reduced rate of image formation, cannot be properly continued, inkjet printing system 500 stops 613 the image forming operation and removes units of media 504 from the media path. In one embodiment of power supply 20, if the voltage provided by AC power source 12 drops below a threshold for continued proper operation of power supply 20, such as 88 VRMS in one embodiment, the energy storage capacity of power supply 20 provides approximately a 400 millisecond time interval to take actions to appropriately handle the voltage drop. However, if controller 514 determines that the measured drop in voltage provided by AC power source 12 is not sufficiently large to warrant stopping of the image formation operation, controller 514 adjusts 614 the operation of one or more assemblies or devices within inkjet printing system 500 in an attempt to maintain the voltage provided by AC power source 12 at least at a desired amount above the threshold for proper operation using the estimated value of impedance 24 or the relationship between current drawn from AC power source 12 and the voltage provided by AC power source 12.

There are a wide variety of ways in which the operation of one or more assemblies could be controlled to accomplish the objective of maintaining the voltage provided by AC power source 12 at least at a desired amount above the threshold for proper operation. For example, the rate at which images are formed on units of media 504 could be reduced. This would reduce the amount of power provided to assemblies such as heater 516, blower 518, printhead 506, media drive 502, and possibly other assemblies within inkjet printing system 500. Controller 514 would make this adjustment by additionally using a previously established relationship (such as might be stored in a look-up table) of the current drawn by inkjet printing system 500 and the rate at which images are formed on units of media 504. The reduction in the rate of image formation could be accomplished by moving units of media 504 through inkjet printing system, or in certain embodiments of inkjet printing system, maintaining the rate at which units of media 504 move through inkjet printing system 500 but having units of media 504 make multiple passes through inkjet printing system 500 at the nominal rate while depositing less of ink 512 on each pass. This mode of operation would reduce the average power supplied to assemblies such as heater 516, blower 518, drive electronics 508, and printhead 506 in an attempt to maintain the voltage provided by AC power source 12 at least at a desired amount above the threshold for proper operation.

When controller 514 determines 616, through monitoring of the measurements provided by voltage measurement device 530, that the drop in the voltage supplied by AC power source 12 below the desired amount above the threshold for proper operation resulting from the current drawn by systems and devices coupled to AC power source 12 other than inkjet printing system 500 is no longer present, controller 514 can continue 618 operation of inkjet printing system 500 in its nominal mode of operation. If the drop in voltage remains or increases, controller 514 causes inkjet printing system 500 to operate, as appropriate, in the reduced rate of image formation mode or stops the image formation operation as previously described.

The disclosed embodiments of the systems allow for several performance benefits. The capability of the systems to adapt to the characteristics of the power source (such as the range of voltage provided by the power source and the impedance of the power source) and to the effect of the operation of other devices coupled to the power source upon the power source that may be associated with the installation of the system allows a single design of the system to operate reliably with power sources having a range of performance characteristics and with other devices coupled to the power source. In addition, use of the disclosed embodiments of the systems allows the assemblies and devices within the systems to be designed to properly operate over a more narrow range of system input voltages than they would have been without using these techniques and still achieve comparably reliable operation. For example, because power supply 20 included in system 10 or inkjet printing system 500 can be designed, with implementation of the disclosed techniques in embodiments of system 10 or inkjet printing system 500, for operation over a more narrow range of input voltages than would be the case without using the disclosed techniques, the cost of power supply 20 would be reduced. One way in which this cost reduction may come about for embodiments of power supply 20 that include a switching power supply would be the use of smaller capacity primary input capacitors. Likewise, other assemblies and devices used within embodiments of the systems may be designed for reduced cost because of the more narrow range of input voltages expected.

While the disclosed embodiments have been particularly shown and described, it should be understood that many variations may be made to these without departing from the spirit and scope defined in the following claims. The detailed description should be understood to include all novel and non-obvious combinations of the elements that have been described, and claims may be presented in this or a later application to any novel and non-obvious combination of these elements. Combinations of the above exemplary embodiments, and other embodiments not specifically described herein will be apparent upon reviewing the above detailed description. The foregoing embodiments are illustrative, and any single feature or element may not be included in the possible combinations that may be claimed in this or a later application. Therefore, the scope of the claimed subject matter should be determined with reference to the following claims, along with the full range of equivalents to which such claims are entitled.

What is claimed is:

1. A method comprising:

determining an amount of power to supply to a load included in a first system having a plurality of loads, using a relationship between a change in the voltage provided by a power source to the first system caused by current drawn during operation of one or more other systems coupled to the power source and a corresponding change in the current supplied by the power source to the first system monitored over a predetermined time interval, to reduce a magnitude of the change in the voltage resulting from the power source; and causing the determined amount of the power to be supplied to the load.

2. The method as recited in claim 1, further comprising:

determining the relationship between the change in the voltage and the corresponding change in the current.

3. The method as recited in claim 2, wherein:

the determining the relationship includes measuring a plurality of voltages provided by the power source to the first system and measuring a plurality of currents provided by the power source to the first system corresponding to the plurality of the voltages.

4. The method as recited in claim 3, wherein:

the determining the relationship includes controlling the first system to dissipate a plurality of different amounts of the power in the load corresponding to the plurality of the voltages and the plurality of the currents.

5. The method as recited in claim 1, further comprising:

monitoring the voltage provided to the first system by the power source; and detecting the change in the voltage provided by the power source caused from the operation of the one or more of the other systems coupled to the power source.

6. The method as recited in claim 1, wherein:

the using the relationship includes determining from the relationship an expected reduction in the magnitude of the change in the voltage to result from supplying the amount of the power to the load.

7. The method as recited in claim 2, wherein:

the determining the relationship includes determining an estimate of a magnitude of an impedance associated with the power source.

8. The method as recited in claim 2, wherein:

the determining the relationship includes determining a set of corresponding pairs of expected changes in the magnitude of the voltage resulting from changes in the current.

9. The method as recited in claim 2, wherein:

the determining the relationship includes determining a time interval during which the changes to the current provided by the power source to the one or more other systems coupled to the power source substantially equal zero.

10. The method as recited in claim 1, wherein:

the load includes a heater;

the first system includes a printing system; and the power source includes an AC mains.

11. The method as recited in claim 1, wherein:

the determining the amount of power includes determining from the using the relationship the amount of the power sufficient to reduce the magnitude of the change in the voltage to a value at least as great as a lower operating voltage of a second load of the plurality of loads of first system coupled to the power source.

12. The method as recited in claim 1, wherein:

the determining the amount of power includes accessing a look-up table specifying the relationship using a desired amount of the reduction in the magnitude of the change in the voltage that results from the power source supplying the current corresponding to the amount of the power.

13. The method as recited in claim 12, wherein the desired amount of the reduction in the magnitude of the change in the voltage corresponds to a value of the voltage that exceeds a threshold voltage for proper operation of a second load coupled to the power source.

14. An apparatus, comprising:

a processing device configured to determine an amount of a power to be supplied to a load of a system having a plurality of loads, using a relationship between a change in the voltage provided by a power source to the system caused by current drawn during operation of one or more other systems coupled to the power source and a corresponding change in current supplied by the power source to the first system monitored over a predetermined time interval, to reduce a change in a value of a voltage resulting from the power source to the system.

15. The apparatus as recited in claim 14, further comprising:

a power controller configured to adjust the power supplied to the load according to the amount of the power determined.

16. The apparatus as recited in claim 14, wherein:

the processing device includes a configuration to determine the amount of the power so that the reduction in the change in the value of the voltage results in the value of the voltage provided by the power source exceeding a lower operating threshold voltage of a second load included in the system by at least a predetermined value.

17. The apparatus as recited in claim 14, further comprising:

a device configured to measure the value of the voltage and a value of a current provided to the system by the power source; and wherein the processing device includes a configuration to determine a relationship between the change in the value of the voltage and a change in the value of the current provided to the system by the power source during a time interval in which the changes to current provided by the power source to the one or more other systems coupled to the power source substantially equal zero.

18. The apparatus as recited in claim 17, wherein:

the time interval corresponds to one or more of: during power up of the system, periodically during operation of the system or, a predetermined time period during a day.

19. A system, comprising:

a device to determine an estimate of a voltage supplied by a power source to the system and an estimate of a current supplied by the power source to the system;

a heater;

a power converter to supply power to the heater; and circuitry to determine an amount of the power to be supplied to the heater to reduce a change in the voltage caused by current drawn during operation of another system coupled to the power source monitored over a predetermined time interval.

20. The system as recited in claim 19, further comprising:

an image forming mechanism to form an image on media;

a DC power supply, wherein the circuitry includes a capability to determine the amount of the power, using a relationship between a change in the voltage supplied by the power source resulting from a change in the current supplied by the power source to the system, so that the voltage remains above an operating voltage threshold of the DC power supply during operation of the system.

* * * * *